United States Patent
Holcomb et al.

(10) Patent No.: US 7,379,496 B2
(45) Date of Patent: May 27, 2008

(54) MULTI-RESOLUTION VIDEO CODING AND DECODING

(75) Inventors: Thomas W. Holcomb, Bothell, WA (US); Shankar Regunathan, Bellevue, WA (US); Chih-Lung Bruce Lin, Redmond, WA (US); Sridhar Srinivasan, Seattle, WA (US)

(73) Assignee: Microsoft Corporation, Remond, WA (US)

(*) Notice: Subject to any disclaimer, the term of this patent is extended or adjusted under 35 U.S.C. 154(b) by 866 days.

(21) Appl. No.: 10/644,258

(22) Filed: Aug. 19, 2003

(65) Prior Publication Data

US 2004/0213345 A1 Oct. 28, 2004

Related U.S. Application Data

(60) Provisional application No. 60/408,477, filed on Sep. 4, 2002.

(51) Int. Cl.
*H04N 7/12* (2006.01)
(52) U.S. Cl. .................................. 375/240.03
(58) Field of Classification Search ............... 348/581, 348/448, 458, 714, 716, 443, 445, 446, 459, 348/721, 401, 402, 409, 410, 413, 415, 416, 348/420, 421, 424.1, 392, 397, 565, 566, 348/567, 568, 423, 555, 556; 375/240.02, 375/240.03, 240.01, 240.24, 240.21, 240.12, 375/240.16, 240.15, 240.29; 382/261, 262, 382/263, 264, 232, 239, 240
See application file for complete search history.

(56) References Cited

U.S. PATENT DOCUMENTS

| | | | | |
|---|---|---|---|---|
| 5,300,949 A | * | 4/1994 | Rodriquez et al. | 345/555 |
| 5,414,469 A | * | 5/1995 | Gonzales et al. | 375/240.18 |
| 5,611,038 A | | 3/1997 | Shaw et al. | |
| 5,764,296 A | | 6/1998 | Shin | |
| RE35,910 E | | 9/1998 | Nagata et al. | |
| 5,821,986 A | * | 10/1998 | Yuan et al. | 348/14.12 |
| 5,828,421 A | * | 10/1998 | Boyce et al. | 348/565 |
| 5,864,637 A | | 1/1999 | Liu et al. | |
| 5,970,173 A | | 10/1999 | Lee et al. | |
| 6,002,801 A | | 12/1999 | Strongin et al. | |
| 6,104,434 A | * | 8/2000 | Nakagawa et al. | 375/240.16 |
| 6,418,166 B1 | | 7/2002 | Wu et al. | |
| 6,499,060 B1 | | 12/2002 | Wang et al. | |

(Continued)

FOREIGN PATENT DOCUMENTS

JP 4-207684 7/1992

(Continued)

OTHER PUBLICATIONS

Iwahashi et al., "A Motion Compensation Technique for Downscaled Pictures in Layered Coding," *IEICE Transactions on Comm.*, vol. E77-B, No. 8, pp. 1007-1012 (Aug. 1994).

(Continued)

*Primary Examiner*—Tung Vo
*Assistant Examiner*—Behrooz Senfi
(74) *Attorney, Agent, or Firm*—Klarquist Sparkman, LLP

(57) ABSTRACT

A video encoder performs multi-resolution video coding. For example, the encoder adaptively changes frame sizes to reduce blocking artifacts at low bitrates. A video decoder performs corresponding multi-resolution decoding.

39 Claims, 10 Drawing Sheets

Software 180 Implementing Multi-Resolution Coding and/or Decoding Techniques

U.S. PATENT DOCUMENTS

| | | | |
|---|---|---|---|
| 6,510,177 B1 | 1/2003 | De Bonet et al. | |
| 6,600,785 B1 | 7/2003 | Nishigori et al. | |
| 6,728,317 B1 | 4/2004 | Demos | |
| 6,823,014 B2* | 11/2004 | Kim | 375/240.21 |
| 6,937,291 B1* | 8/2005 | Gryskiewicz | 348/581 |
| 2002/0064226 A1* | 5/2002 | Bauer et al. | 375/240.02 |
| 2002/0186890 A1 | 12/2002 | Lee et al. | |
| 2004/0042549 A1 | 3/2004 | Huang et al. | |

FOREIGN PATENT DOCUMENTS

| | | |
|---|---|---|
| JP | 2000-165866 | 6/2000 |
| WO | WO 00/33581 | 6/2000 |
| WO | WO 01/95633 | 12/2001 |

OTHER PUBLICATIONS

Kwon et al., "Adaptive Bitrate Allocation in Spatial Scalable Video Coding of Fixed Total Bitrate, "*IEICE Trans. Fundamentals*, vol. E81-A, No. 5, pp. 950-956 (May 1998).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ISO/IEC, "ISO/IEC 11172-2: Information Technology—Coding of Moving Pictures and Associated Audio for Storage Media at up to About 1,5 Mbit/s," 122 pp. (1993).

Joint Video Team (JVT) of ISO/IEC MPEG & ITU-T VCEG, "Joint Final Committee Draft (JFCD) of Joint Video Specification," JVT-D157, 207 pp. (Aug. 2002).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005).

Brainard et al., "Composite Television Coding: Subsampling and Interpolation," *SMPTE Journal*, pp. 717-724 (Aug. 1982).

Einarsson et al., "Mixed Resolution Video Coding for Low Bit-Rate Channels," *Proc. Int'l Workshop on Coding Techniques for Very Low Bit-rate Video: VLBV97*, Linköping, Sweden, pp. 77-80 (Jul. 1997).

ITU, Recommendation H.261, "Line Transmission of Non-Telephone Signals", 28 pp., Mar. 1993.

ITU, Recommendation H.262, "Transmission of Non-Telephone Signals", 211 pp., Jul. 1995.

ITU, Recommendation H.263, "Video Coding for Low Bit Rate Communication", 167 pp., Feb. 1998.

ISO/IEC, Committee Draft N2202, "Information Technology—Coding of Audio-Visual Objects: Visual", 326 pp., Mar. 1998.

Anonymous, "DivX Multi Standard Video Encoder," 2 pp.

Catmull et al., "A Class of Local Interpolating Splines," Computer Aided Geometric Design, Academic Press, pp. 317-326 (1974).

Dufaux et al., "Abstract: Motion-compensated generic coding of video based on a multi resolution data structure," 2 pp. (1993) [downloaded from the World Wide Web on Jan. 25, 2006].

Keys, "Cubic Convolution Interpolation for Digital Image Processing," Computer Graphics, vol. ASSP-29, No. 6, pp. 1153-1160 (Dec. 1981).

Mitchell et al., "Reconstruction Filters in Computer Graphics," Computer Graphics, vol. 22, No. 4 pp. 221-228 (Aug. 1988).

Segall, "Study of Upsampling/Downsampling for Spatial Scalability," JVT-Q083, Nice, France, 18 pp. (Oct. 2005).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Wien, "Variable Block-Size Transforms for Hybrid Video Coding," Dissertation, 184 pp. (Feb. 2004).

* cited by examiner

Software 180 Implementing Multi-Resolution Coding and/or Decoding Techniques

AW1 = 70
AW2 = 5
AW3 = -11 downsamplefilter_line(x[])
{
   y[0] = (((x[0] + x[1]) * AW1 + (x[2] + x[0]) * AW2 + (x[3] + x[1]) * AW3+ RND_DOWN) >> 7)

for(Int j = 2 j < Nu -2 j += 2) {
      y[j] =  (((x[j] + x[j+1]) * AW1 + (x[j-1] + x[j+2]) * AW2 + (x[j-2] + x[j+3]) * AW3 + RND_DOWN) >> 7)
   } y[Nu-2] =  (((x[Nu-2] + x[Nu-1]) * AW1 + (x[Nu-3] + x[Nu-1]) * AW2 + (x[Nu-4] + x[Nu-2]) * AW3 + RND_DOWN) >> 7)

for(j = 0 j < Nu j+=2) {
     x[j] = CLIP(y[j])
     x[j+1] = 0
   }

Figure 11

```
SW1 = 28
SW2 = 6                                              1100
SW3 = -3
upsamplefilter_line(x[])
{
    y[0] = ((x[0] * SW1 + x[0] * SW2 + x[2] * SW3 + x[4] + RND_UP) >> 5)
    y[1] = ((x[0] * SW1 + x[2] * SW2 + x[0] * SW3 + x[2] + RND_UP) >> 5)
    y[2] = ((x[2] * SW1 + x[0] * SW2 + x[4] * SW3 + x[6] + RND_UP) >> 5)
    y[3] = ((x[2] * SW1 + x[4] * SW2 + x[0] * SW3 + x[0] + RND_UP) >> 5)

for( j = 4 j < Nu - 4 j += 2) {
        y[j] = ((x[j] * SW1 + x[j-2] * SW2 + x[j+2] * SW3 + x[j+4] + RND_UP) >> 5)
        y[j+1] = ((x[j] * SW1 + x[j+2] * SW2 + x[j-2] * SW3 + x[j-4] + RND_UP) >> 5)
    } y[Nu-4] = ((x[Nu-4] * SW1 + x[Nu-6] * SW2 + x[Nu-2] * SW3 + x[Nu-2] + RND_UP) >> 5)
    y[Nu-3] = ((x[Nu-4] * SW1 + x[Nu-2] * SW2 + x[Nu-6] * SW3 + x[Nu-8] + RND_UP) >> 5)
    y[Nu-2] = ((x[Nu-2] * SW1 + x[Nu-4] * SW2 + x[Nu-2] * SW3 + x[Nu-4] + RND_UP) >> 5)
    y[Nu-1] = ((x[Nu-2] * SW1 + x[Nu-2] * SW2 + x[Nu-4] * SW3 + x[Nu-6] + RND_UP) >> 5)

for(j = 0 j < Nu j++)
        x[j] = CLIP(y[j])
}
```

MULTI-RESOLUTION VIDEO CODING AND DECODING

RELATED APPLICATION INFORMATION

This application claims the benefit of U.S. Provisional Patent Application No. 60/408,477, filed Sep. 4, 2002, the disclosure of which is hereby incorporated herein by reference.

FIELD

The present invention relates to multi-resolution video coding and decoding. For example, a video encoder adaptively changes video frame sizes to reduce blocking artifacts at low bitrates.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bitrate, of a typically raw digital video sequence can be 5 million bits/second or more.

Most computers and computer networks lack the resources to process raw digital video. For this reason, engineers use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic in subsequent lossless compression. Decompression reverses compression.

In general, video compression techniques include intraframe compression and interframe compression. Intraframe compression techniques compress individual frames, typically called I-frames, key frames, or reference frames. Interframe compression techniques compress frames with reference to preceding and/or following frames, and are called typically called predicted frames, P-frames, or B-frames.

Many intraframe and interframe compression techniques are block-based. A video frame is split into blocks for encoding. For example, an I-frame is split into 8×8 blocks and the blocks are compressed. Or, a P-frame is split into 16×16 macroblocks (e.g., with 4 8×8 luminance blocks and 2 8×8 chrominance blocks) and the macroblocks are compressed. Different implementations can use different block configurations.

Standard video encoders experience a dramatic degradation in performance when the target rate falls below a certain threshold. For block-based video compression and decompression, quantization and other lossy processing stages introduce distortion that commonly shows up as blocking artifacts—perceptible discontinuities between blocks. At low bitrates, high frequency information for the blocks of I-frames may be heavily distorted or completely lost. Similarly, high frequency information for the residuals of blocks of P-frames (the parts of the P-frames not predicted by motion estimation or other prediction) may be heavily distorted or completely lost. As a result, significant blocking artifacts can arise in "low-pass" regions, and cause a substantial drop in the quality of the reconstructed video.

Some previous encoders attempt to reduce the perceptibility of blocking artifacts by processing reconstructed frames with a deblocking filter. The deblocking filter smoothes the boundaries between blocks. While the deblocking filter can improve perceived video quality, it has several disadvantages. For example, the smoothing occurs only on reconstructed output in the decoder. Therefore, the effect of deblocking cannot be factored into the process of motion estimation, motion compensation or transform coding for a current frame, even when in-loop deblocking is being used. On the other hand, the smoothing of the current frame by the post-processing filter (i.e., out-of-loop deblocking) can be too extreme, and the smoothing process introduces unnecessary computational complexity.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for multi-resolution video coding. For example, a video encoder adaptively changes video frame sizes to reduce blocking artifacts at low bitrates. In doing so, the encoder decreases blocking artifacts but may increase blurring, which is less perceptible and less objectionable than the blocking artifacts. The various techniques and tools can be used in combination or independently.

In one aspect, a video encoder encodes video at any of multiple spatial resolutions. The encoder encodes at least one frame in a sequence of multiple video frames at a first spatial resolution, and encodes at least one other frame at a second spatial resolution. The second spatial resolution differs from the first spatial resolution, and the encoder chooses the second spatial resolution from a set of multiple spatial resolutions to reduce blocking artifacts in the sequence of video frames.

In another aspect, an encoder encodes a first part of a frame at a first spatial resolution, and encodes a second part of the frame at a second spatial resolution. The second spatial resolution differs from the first spatial resolution.

In another aspect, a video encoder includes a first code in a bitstream to indicate a first spatial resolution for a first frame encoded at the first spatial resolution, and includes a second code in the bitstream to indicate a second spatial resolution for a second frame encoded at the second spatial resolution. The second spatial resolution differs from the first spatial resolution, and the encoder chooses the second spatial resolution from a set of multiple spatial resolutions to reduce blocking artifacts in the sequence of video frames.

In another aspect, an encoder includes a first signal in a bitstream to indicate a first spatial resolution for a first part of a frame, and includes a second signal in the bitstream to indicate a second spatial resolution for a second part of the frame. The second spatial resolution differs from the first spatial resolution.

In another aspect, a decoder receives a multi-resolution signal in a sequence header for a video sequence of multiple encoded frames. The multi-resolution signal indicates whether the multiple frames are encoded at more than one spatial resolution. If the multiple frames are encoded at more than one spatial resolution, the decoder decodes a first encoded frame at a first spatial resolution, and decodes a second encoded frame at a second spatial resolution.

In another aspect, a decoder decodes a first part of an encoded frame at a first spatial resolution, and decodes a second part of the encoded frame at a second spatial resolution. The second spatial resolution differs from the first spatial resolution.

In another aspect, an encoder or decoder receives pixel data for a video image and adaptively changes the spatial resolution of the video image, including computing re-sampled pixel data using a six-tap down-sampling filter or a ten-tap up-sampling filter.

Additional features and advantages will be made apparent from the following detailed description of various embodiments that proceeds with reference to the accompanying drawings.

BRIEF DESCRIPTION OF THE DRAWINGS

FIG. 10 is a pseudo-code listing for a down-sampling filter in one implementation.

FIG. 11 is a pseudo-code listing for an up-sampling filter in one implementation.

DETAILED DESCRIPTION

Described embodiments of the present invention are directed to multi-resolution video coding and decoding. For example, a video encoder adaptively changes video frame sizes to reduce blocking artifacts at low bitrates. In doing so, the encoder decreases blocking artifacts but may increase blurring, which is less perceptible and objectionable than the blocking artifacts.

In some embodiments, an encoder uses multi-resolution coding techniques and tools to encode input frames at different spatial resolutions. For example, in one implementation, an encoder encodes frames at a full original resolution, at a resolution down-sampled by a factor of 2 in the horizontal direction, at a resolution down-sampled by a factor of 2 in the vertical direction, or at a resolution down-sampled by a factor of 2 in both the horizontal direction and the vertical direction. Alternatively, the encoder decreases or increases the resolution of the coded frame by some other factor relative to the original resolution, by some factor relative to a current resolution, or sets resolutions using some other technique. A decoder decodes encoded frames using corresponding techniques.

In some embodiments, the encoder chooses the spatial resolution for frames on a frame-by-frame basis or on some other basis. A decoder performs corresponding adjustment.

In some embodiments, the encoder chooses the spatial resolution by evaluating certain criteria (e.g., bitrate, frame content, etc.).

The various techniques and tools can be used in combination or independently. Different embodiments implement one or more of the described techniques and tools. Different techniques and tools can be used in combination, independently, or with other techniques and tools.

I. Computing Environment

Figure 1:
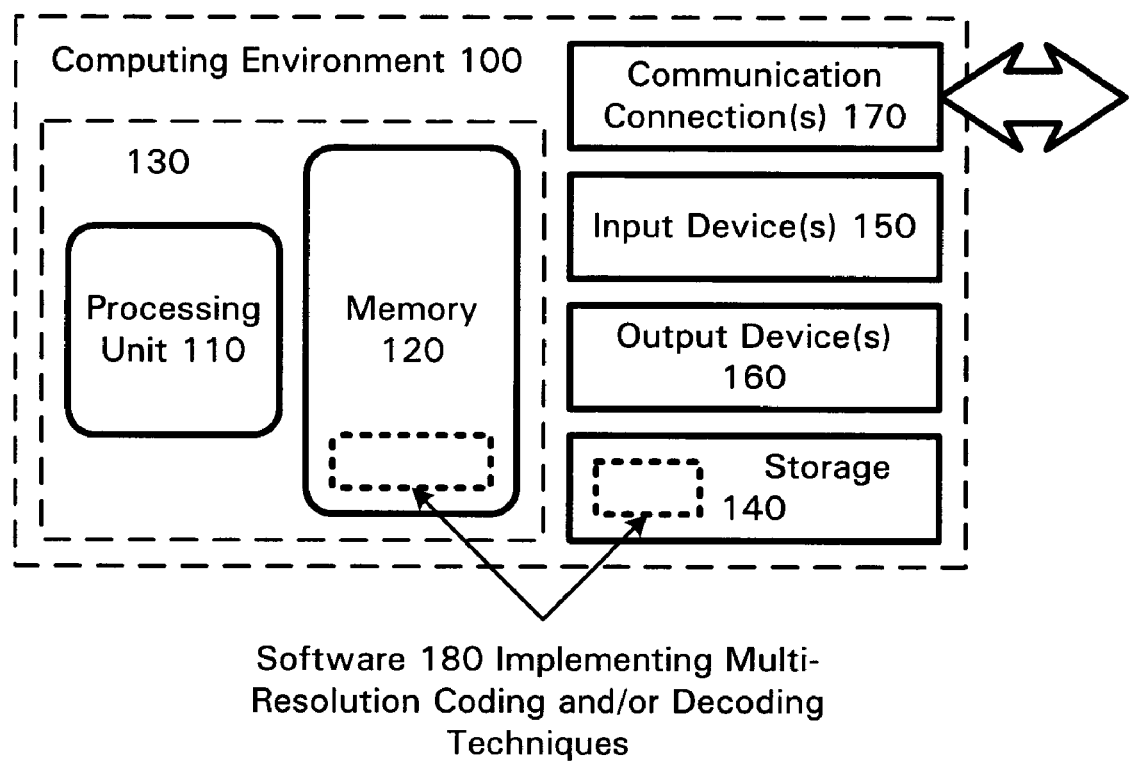
FIG. 1 is a block diagram of a suitable computing environment in which described embodiments may be implemented.

FIG. 1 illustrates a generalized example of a suitable computing environment (100) in which described embodiments may be implemented. The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing multi-resolution coding and/or decoding techniques.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, CD-RWs, DVDs, or any other medium which can be used to store information and which can be accessed within the computing environment (100). The storage (140) stores instructions for the software (180) implementing the multi-resolution coding and/or decoding techniques.

The input device(s) (150) may be a touch input device such as a keyboard, mouse, pen, or trackball, a voice input device, a scanning device, network adapter, or another device that provides input to the computing environment (100). For video, the input device(s) (150) may be a TV tuner card, camera video interface, or similar device that accepts video input in analog or digital form, or a CD-ROM/DVD reader that provides video input to the computing environment. The output device(s) (160) may be a display, printer, speaker, CD/DVD-writer, network adapter, or another device that provides output from the computing environment (100).

The communication connection(s) (170) enable communication over a communication medium to another computing entity. The communication medium conveys information such as computer-executable instructions, compressed video information, or other data in a modulated data signal. A modulated data signal is a signal that has one or more of its characteristics set or changed to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, within the computing environment (100), computer-readable media include memory (120), storage (140), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "set," "choose," "encode," and "decode" to describe computer operations in a computing environment. These terms are high-level abstractions for operations performed by a computer, and should not be confused with acts performed by a human being. The actual computer operations corresponding to these terms vary depending on implementation.

II. Example Video Encoder and Decoder

The techniques and tools in the various embodiments can be implemented in a video encoder and/or decoder. Video encoders and decoders may contain within them different modules, and the different modules may relate to and communicate with one another in many different ways. The modules and relationships described below are exemplary.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

The example encoder and decoder are block-based and use a 4:2:0 macroblock format, with each macroblock including 4 luminance 8×8 luminance blocks (at times treated as one 16×16 macroblock) and two 8×8 chrominance blocks. Alternatively, the encoder and decoder are object-based, use a different macroblock or block format, or perform operations on sets of pixels of different size or configuration than 8×8 blocks and 16×16 macroblocks.

A. Example Video Encoder

An encoder receives a sequence of video frames including a current frame and produces compressed video information as output. The encoder compresses predicted frames and key frames. Many of the components of the encoder are used for compressing both key frames and predicted frames. The exact operations performed by those components can vary depending on the type of information being compressed.

A predicted frame (also called P-frame, B-frame for bi-directional prediction, or inter-coded frame) is represented in terms of prediction (or difference) from one or more other frames. A prediction residual is the difference between what was predicted and the original frame. In contrast, a key frame (also called I-frame, intra-coded frame) is compressed without reference to other frames.

Figure 2:
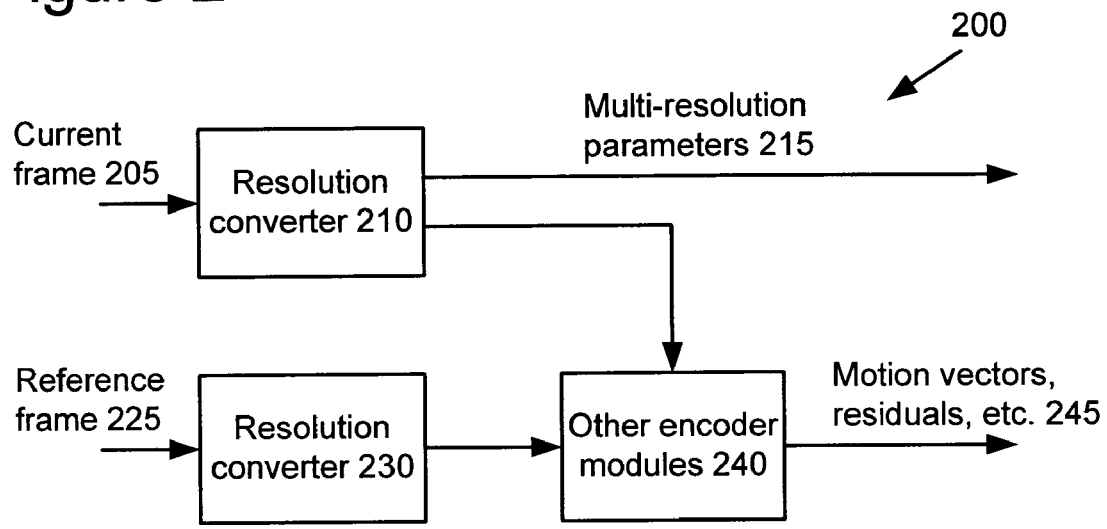
FIG. 2 is a block diagram of a video encoder in which described embodiments may be implemented.

Referring to FIG. 2, in some embodiments, an encoder (200) encoding a current frame (205) includes a resolution converter (210) for multi-resolution encoding. The resolution converter (210) receives the current frame (205) as input and outputs multi-resolution parameters (215) as well as the frame as converted. If the current frame (205) is a predicted frame, resolution converter (230) receives as input the reference frame (225) for the current frame (205) and outputs the reference frame as converted.

The resolution converters (210) and (230) communicate with other encoder modules (240), and, in turn, the other encoder modules (240) produce output (245) (e.g., pixel block data, motion vectors, residuals, etc.) based in part on multi-resolution coding information (e.g., multi-resolution parameters (215)) provided by the resolution converters (210) and (230).

The other encoder modules (240) may include, for example, a motion estimator, a motion compensator, a frequency transformer, a quantizer, a frame store, and an entropy encoder.

If the current frame (205) is a forward-predicted frame, a motion estimator estimates motion of macroblocks or other sets of pixels of the current frame (205) with respect to the reference frame (225), which is the reconstructed previous frame buffered in a frame store. In alternative embodiments, the reference frame (225) is a later frame or the current frame (205) is bi-directionally predicted. A motion compensator applies the motion information to the reconstructed previous frame to form a motion-compensated current frame. The prediction is rarely perfect, however, and the difference between the motion-compensated current frame and the original current frame (205) is the prediction residual. Alternatively, a motion estimator and motion compensator apply another type of motion estimation/compensation.

A frequency transformer converts the spatial domain video information into frequency domain (i.e., spectral) data. For block-based video frames, the frequency transformer applies a discrete cosine transform ["DCT"] to blocks of the pixel data or prediction residual data, producing blocks of DCT coefficients. Alternatively, the frequency transformer applies another conventional frequency transform such as a Fourier transform or uses wavelet or subband analysis.

A quantizer then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

When a reconstructed current frame is needed for subsequent motion estimation/compensation, modules of the encoder (200) reconstruct the current frame (205), typically performing the inverse of the technique used to encode the frame. A frame store buffers the reconstructed current frame for use in predicting the next frame.

An entropy coder compresses the output of the quantizer as well as certain side information (e.g., motion information, quantization step size, etc.). Typical entropy coding techniques include arithmetic coding, differential coding, Huffman coding, run-length coding, LZ coding, dictionary coding, and combinations or variations of the above. The entropy coder typically uses different coding techniques for different kinds of information, and can choose from among multiple code tables within a particular coding technique.

For additional detail about the other encoder modules (240) in some embodiments, see U.S. patent application Ser. No. 09/849,502, entitled, "DYNAMIC FILTERING FOR LOSSY COMPRESSION," filed May 3, 2001; U.S. patent application Ser. No. 09/201,278, entitled, "EFFICIENT MOTION VECTOR CODING FOR VIDEO COMPRESSION," filed Nov. 30, 1998; U.S. Pat. No. 6,499,060 to Wang et al.; and U.S. Pat. No. 6,418,166 to Wu et al., the disclosures of each of which are hereby incorporated by reference.

B. Example Video Decoder

Figure 3:
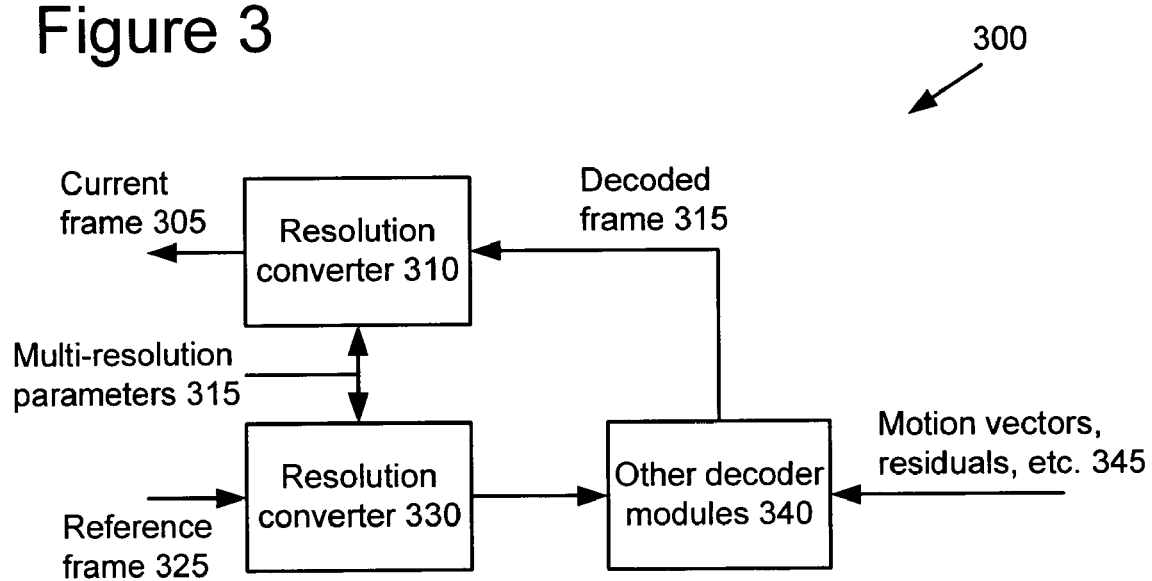
FIG. 3 is a block diagram of a video decoder in which described embodiments may be implemented.

Referring to FIG. 3, a decoder (300) receives information for a compressed sequence of video frames and produces output including a reconstructed frame. The decoder (300) decompresses predicted frames and key frames. Many of the components of the decoder (300) are used for compressing both key frames and predicted frames. The exact operations performed by those components can vary depending on the type of information being compressed.

In some embodiments, a decoder (300) reconstructing a current frame (305) includes a resolution converter (310) for multi-resolution decoding. The resolution converter (310) takes a decoded frame (315) as input and outputs the reconstructed current frame (305).

If the current frame (305) is a predicted frame, resolution converter (330) receives as input multi-resolution parameters (315) and the reference frame (325) for the current frame (305). The resolution converter (330) outputs reference frame information to the other decoder modules (340). The other decoder modules (340) use the reference frame information, along with motion vectors, residuals, etc. (345) received from the encoder, to decode the current frame (305).

The other encoder modules (340) may include, for example, a buffer, an entropy decoder, motion compensator, frame store, an inverse quantizer, and an inverse frequency transformer.

A buffer receives the information (345) for the compressed video sequence and makes the received information available to the entropy decoder. The buffer typically receives the information at a rate that is fairly constant over time, and includes a jitter buffer to smooth short-term variations in bandwidth or transmission. The buffer can include a playback buffer and other buffers as well. Alternatively, the buffer receives information at a varying rate.

The entropy decoder decodes entropy-coded quantized data as well as entropy-coded side information (e.g., motion information, quantization step size, etc.), typically applying the inverse of the entropy encoding performed in the encoder. The entropy decoder frequently uses different decoding techniques for different kinds of information, and can choose from among multiple code tables within a particular decoding technique.

If the frame to be reconstructed is a forward-predicted frame, a motion compensator applies motion information to a reference frame to form a prediction of the frame being reconstructed. For example, the motion compensator uses a macroblock motion vector to find a macroblock in the reference frame. A frame buffer stores previous reconstructed frames for use as reference frames. Alternatively, a motion compensator applies another type of motion compensation. The prediction by the motion compensator is rarely perfect, so the decoder also reconstructs prediction residuals.

When the decoder needs a reconstructed frame for subsequent motion compensation, the frame store buffers the reconstructed frame for use in predicting the next frame.

An inverse quantizer inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use frequency transformations.

An inverse frequency transformer converts the quantized, frequency domain data into spatial domain video information. For block-based video frames, the inverse frequency transformer applies an inverse DCT ["IDCT"] to blocks of the DCT coefficients, producing pixel data or prediction residual data for key frames or predicted frames, respectively. Alternatively, the frequency transformer applies another conventional inverse frequency transform such as a Fourier transform or uses wavelet or subband synthesis.

For additional detail about the other decoder modules (340) in some embodiments, see U.S. patent application Ser. No. 09/849,502, entitled, "DYNAMIC FILTERING FOR LOSSY COMPRESSION," filed May 3, 2001; U.S. patent application Ser. No. 09/201,278, entitled, "EFFICIENT MOTION VECTOR CODING FOR VIDEO COMPRESSION," filed Nov. 30, 1998; U.S. Pat. No. 6,499,060 to Wang et al.; and U.S. Pat. No. 6,418,166 to Wu et al.

III. Multi-Resolution Video Coding and Decoding

In multi-resolution coding, an encoder encodes input frames at different spatial resolutions. The encoder chooses the spatial resolution for frames on a frame-by-frame basis or on some other basis. In some embodiments, the encoder chooses the spatial resolution based on the following observations.

1. As the bitrate decreases, the benefits of coding at lower spatial resolution increase.
2. As quantizer step size increases, the benefits of coding at lower spatial resolution increase.
3. Because down-sampling discards high-frequency information, down-sampling is sometimes not well-suited for frames with perceptually important high frequency content (e.g., "strong edges," text, etc.).
4. Down-sampling may be appropriate if the frame has low-pass characteristics, or if the frame has noise-like high frequency content.

In some embodiments, the encoder uses bitrate, quantizer step size, and the orientation/magnitude of high-frequency energy of the current frame to choose the spatial resolution. For example, if the magnitude of the horizontal high-frequency component of the current frame is large, but the magnitude of the vertical high-frequency component is small, the encoder chooses vertical down-sampling. In other embodiments, the encoder uses information from the reference frame (instead of or in combination with the information from the current frame) to choose the spatial resolution. Alternatively, the encoder may omit some or all of the above criteria, substitute other criteria for some of the above criteria, or use additional criteria to choose the spatial resolution.

Once the encoder has chosen a spatial resolution for a current frame, the encoder re-samples the original frame to the desired resolution before coding it. If the current frame is a predicted frame, the encoder also re-samples the reference frame for the predicted frame to match the new resolution of the current frame. The encoder then transmits the choice of resolution to the decoder. In one implementation, a six-tap filter is used for down-sampling, and a ten-tap filter is used for up-sampling, with the filters designed jointly to increase the quality of the reconstructed video. Alternatively, other filters are used.

Figure 4:
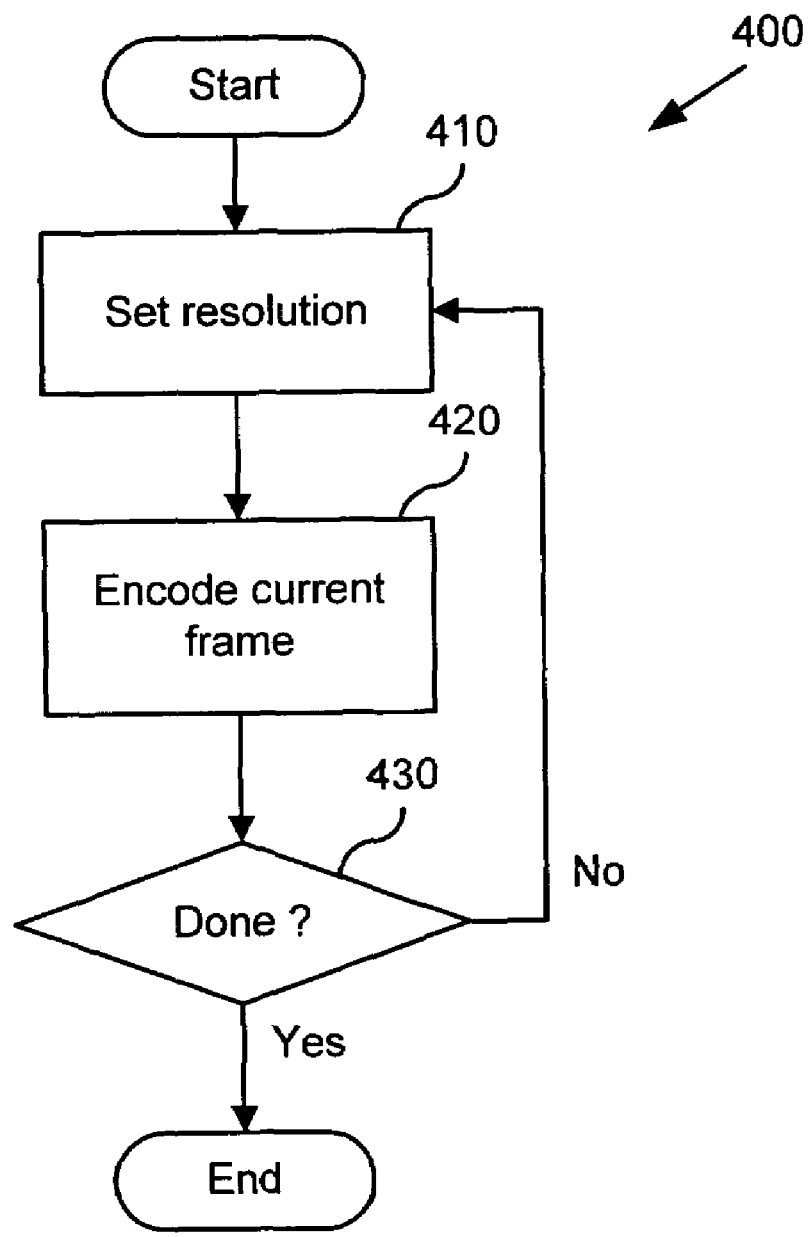
FIG. 4 is a flowchart showing a generalized technique for multi-resolution encoding of frames.

FIG. 4 shows a technique (400) for multi-resolution encoding of frames. An encoder, such as encoder (200) in FIG. 2 sets a resolution (410) for a frame. For example, the encoder considers the criteria listed above or other criteria.

The encoder then encodes the frame (420) at that resolution. If the encoding is done (430), the encoder exits. If not, the encoder sets a resolution (410) for the next frame and continues encoding. Alternatively, the encoder sets resolutions at some level other than frame level.

Figure 6:
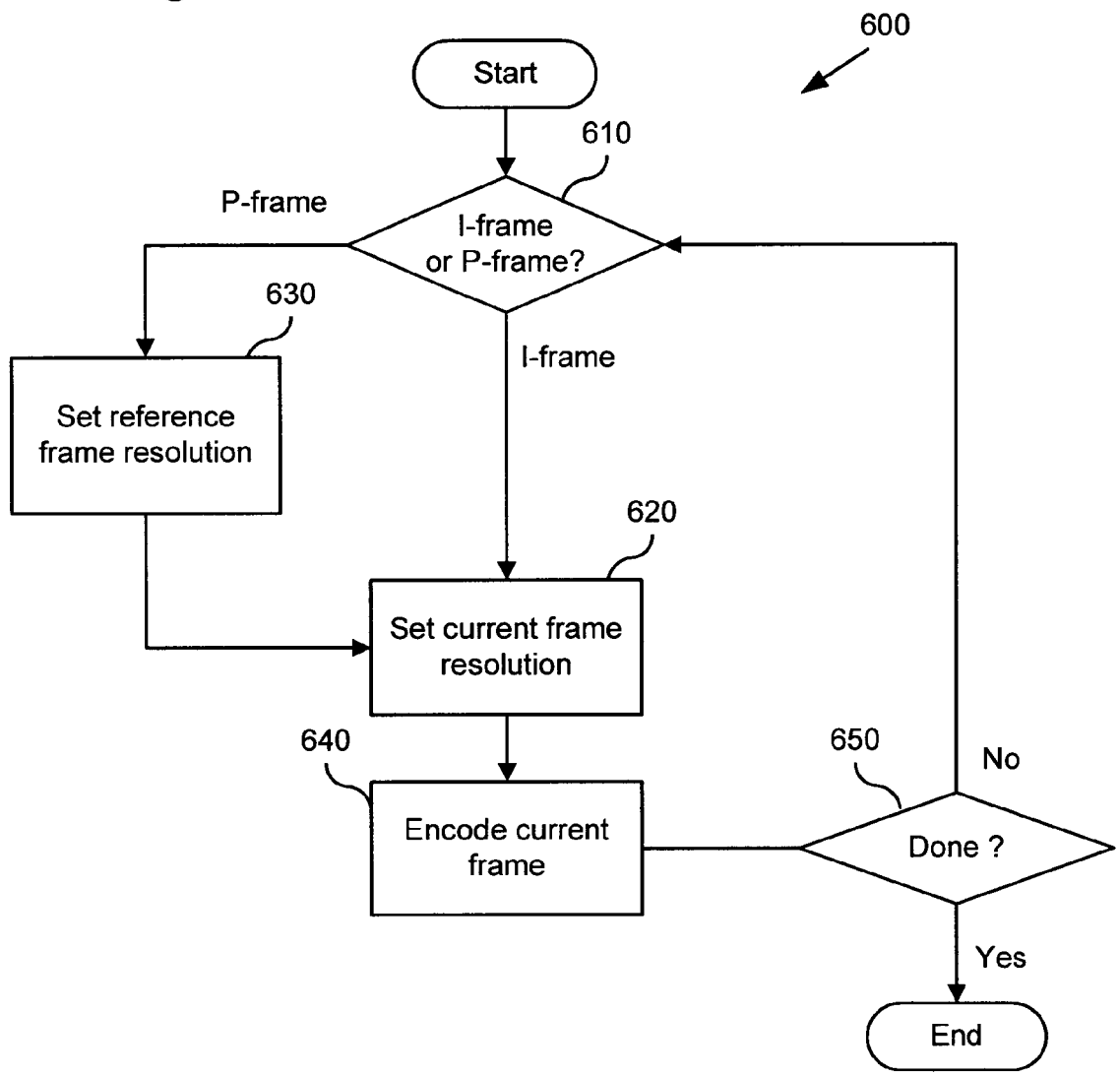
FIG. 6 is a flowchart showing a technique for multi-resolution encoding of intra frames and predicted frames

In some embodiments, the encoder encodes predicted frames as well as intra frames. FIG. 6 shows a technique (600) for multi-resolution encoding of intra frames and predicted frames.

First, the encoder checks whether the current frame to be encoded is an I-frame or a P-frame (610). If the current frame is an I-frame, the encoder sets the resolution for the current frame (620). If the frame is a P-frame, the encoder sets the resolution for the reference frame (630) before setting the resolution for the current frame (620).

After setting the resolution for the current frame (620), the encoder encodes the current frame (640) at that resolution. If the encoding is done (650), the encoder exits. If not, the encoder continues encoding.

In some implementations, the encoder selectively encodes frames at one of the following resolutions: 1) full original resolution, 2) resolution down-sampled by a factor of 2 in the horizontal direction, 3) resolution down-sampled by a factor of 2 in the vertical direction, or 4) resolution down-sampled by a factor of 2 in both the horizontal direction and the vertical direction. Alternatively, the encoder decreases or increases the resolution by some other factor (e.g., not a power of 2), has additional resolutions available, or sets resolutions using some other technique. The encoder sets the resolution for each frame relative to the original image size. Alternatively, the encoder sets the resolution for a frame relative to the resolution of the previous frame or the previous resolution setting; in other words, the encoder progressively changes resolutions relative to previous resolutions.

A decoder decodes the encoded frame, and, if necessary, up-samples the frame before display. Like the resolution of the encoded frame, the resolution of the decoded frame can be adjusted in many different ways.

Figure 5:
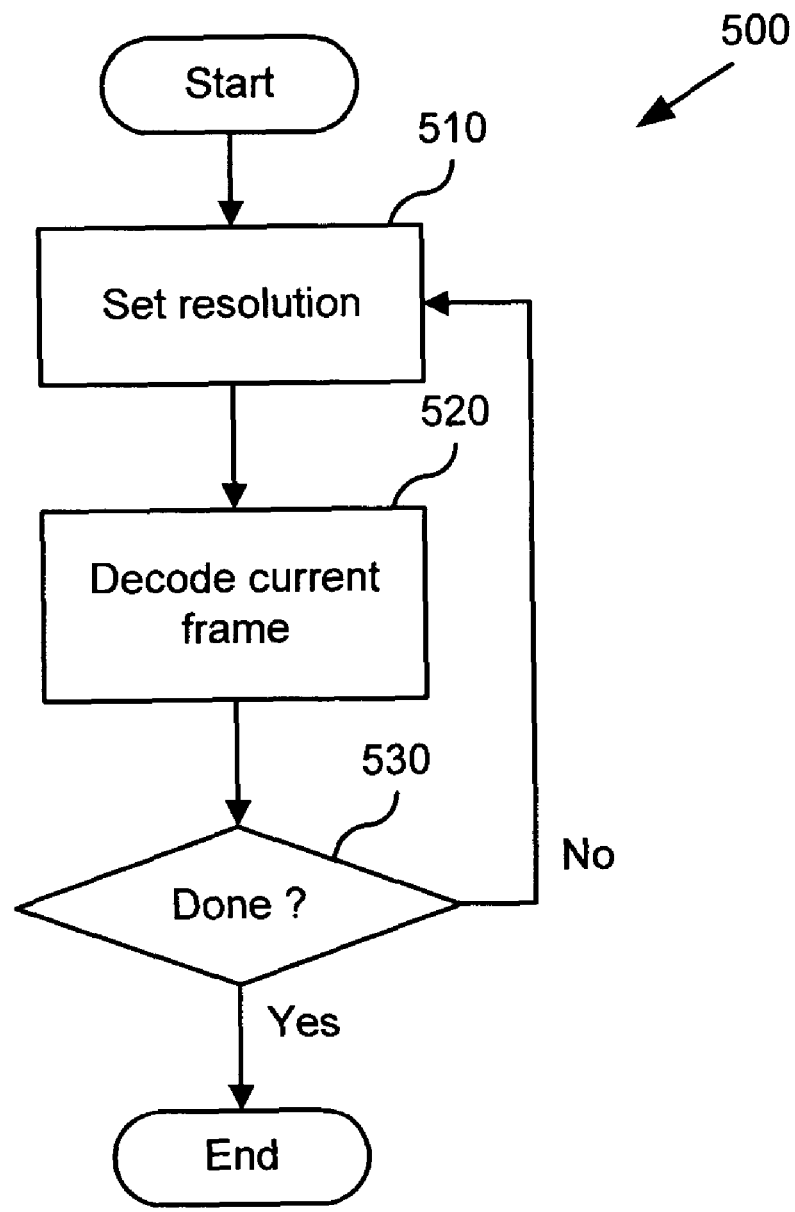
FIG. 5 is a flowchart showing a generalized technique for multi-resolution decoding of frames.

FIG. 5 shows a technique (500) for multi-resolution decoding of frames. A decoder, such as decoder (300) in FIG. 3, sets a resolution (510) for a frame. For example, the decoder gets resolution information from the encoder.

The decoder then decodes the frame (520) at that resolution. If the decoding is done (530), the decoder exits. If not, the decoder sets a resolution (510) for the next frame and continues decoding. Alternatively, the decoder sets resolutions at some level other than frame level.

Figure 7:
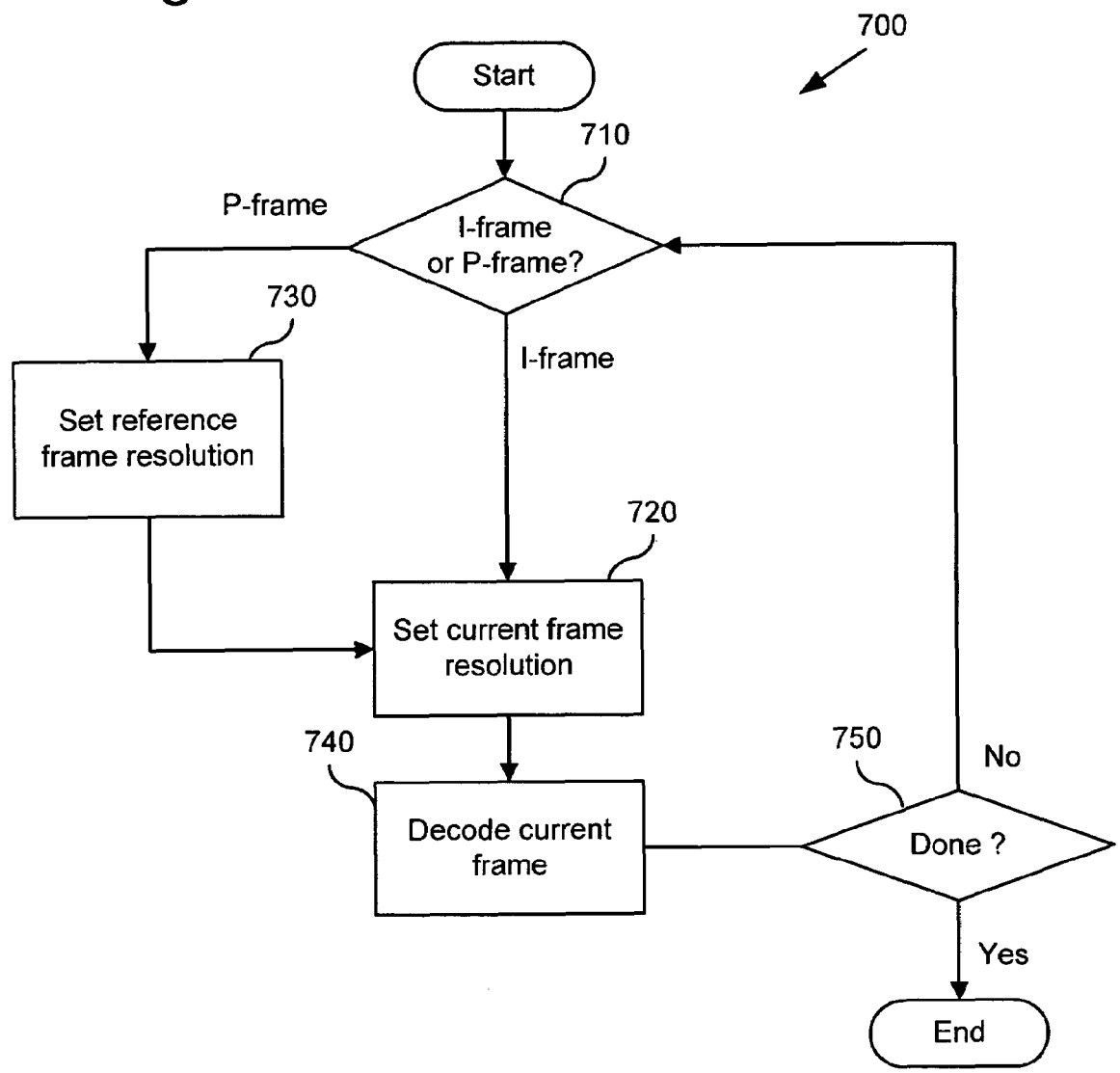
FIG. 7 is a flowchart showing a technique for multi-resolution decoding of intra frames and predicted frames.

In some embodiments, the decoder decodes predicted frames as well as intra frames. FIG. 7 shows a technique (700) for multi-resolution decoding of intra frames and predicted frames.

First, the decoder checks whether the current frame to be decoded is an I-frame or a P-frame (710). If the current frame is an I-frame, the decoder sets the resolution for the current frame (720). If the frame is a P-frame, the decoder sets the resolution for the reference frame (730) before setting the resolution for the current frame (720).

After setting the resolution for the current frame (720), the decoder decodes the current frame (740) at that resolution. If the decoding is done (750), the decoder exits. If not, the decoder continues decoding.

The decoder typically decodes frames at one of the resolutions used in the encoder, for example, the resolutions described above. Alternatively, the resolutions available to the decoder are not exactly the same as those used in the encoder.

A. Signaling

To provide the decoder with sufficient information to decode multi-resolution encoded frames, the encoder uses bitstream signaling. For example, the encoder may send signals in the form of one or more flags or codes to indicate whether a sequence of frames is encoded using multi-resolution encoding, and/or to indicate the resolution of encoded frames within a sequence. Alternatively, the encoder enables/disables multi-resolution coding at some level other than the sequence level and/or sets resolutions at some level other than the frame level.

Figure 8:
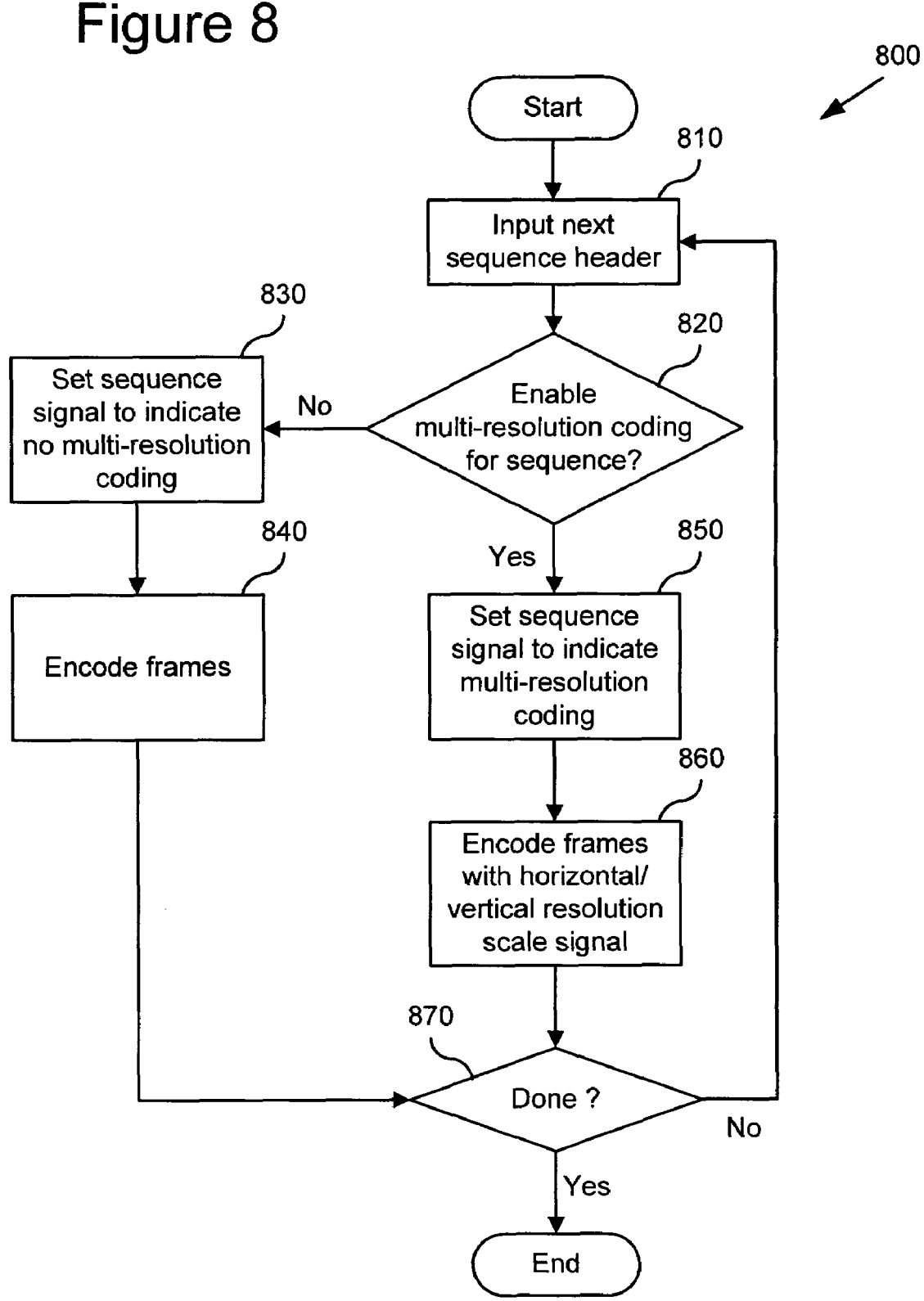
FIG. 8 is a flowchart showing a technique for sending signals when encoding sequences of frames with multi-resolution encoding.

FIG. 8 shows a technique (800) for sending signals when encoding sequences of frames with multi-resolution encoding. The encoder takes the next sequence header as input (810) and decides whether to enable multi-resolution encoding for the sequence (820).

If the encoder is not using multi-resolution encoding for the sequence, the encoder sets the sequence signal accordingly (830), and encodes the frames in the sequence (840).

If the encoder is using multi-resolution encoding, the encoder sets the sequence signal accordingly (850). The encoder then encodes the frames in the sequence (for example, as described above with reference to FIG. 4 or FIG. 6) with a signal indicating the scaling factor for the horizontal and/or vertical resolution for the frames.

If the encoding is done (870), the encoder exits. Otherwise, the encoder encodes the next sequence.

In some embodiments, the encoder sends one bit to indicate whether multi-resolution coding is enabled for a sequence of frames. Then, for frames within the sequence, a code in a designated field for each of the I-frames and P-frames specifies the scaling factor for the resolution of the frame relative to a full resolution frame. In one implementation, the code is a fixed length code. Table 1 shows how the scaling factor is encoded in the field labeled RESPIC FLC.

| RESPIC FLC | Horizontal Scale | Vertical Scale |
|---|---|---|
| 00 | Full | Full |
| 01 | Half | Full |
| 10 | Full | Half |
| 11 | Half | Half |

Table 1: Picture Resolution Code-Table

Alternatively, the encoder uses another method of signaling adjustments to frame resolution (e.g., variable-length codes). Depending on the implementation and the number of possible resolutions, the encoder may use additional signal codes or fewer signal codes, or may use different codes for horizontal and vertical resolutions. Moreover, depending on the relative probabilities of the possible resolutions, the encoder may adjust the length of the codes (e.g., assigning shorter codes to the most probable resolutions). Furthermore, the encoder can use signals for other purposes. For example, the encoder may use a signal (e.g., a fixed or variable-length code) to indicate which filter is to be used for re-sampling in situations where more than one filter is available. The encoder can use such a signal to indicate which of the available pre-defined filters or custom filters should be used in re-sampling.

By sending signals, the encoder provides the decoder with information useful for decoding multi-resolution encoded frames. The decoder parses the signals to determine how the encoded frames should be decoded. For example, the decoder may interpret codes transmitted by the encoder to determine whether a sequence of frames is encoded using multi-resolution encoding, and/or to determine the resolution of the encoded frames within the sequence.

Figure 9:
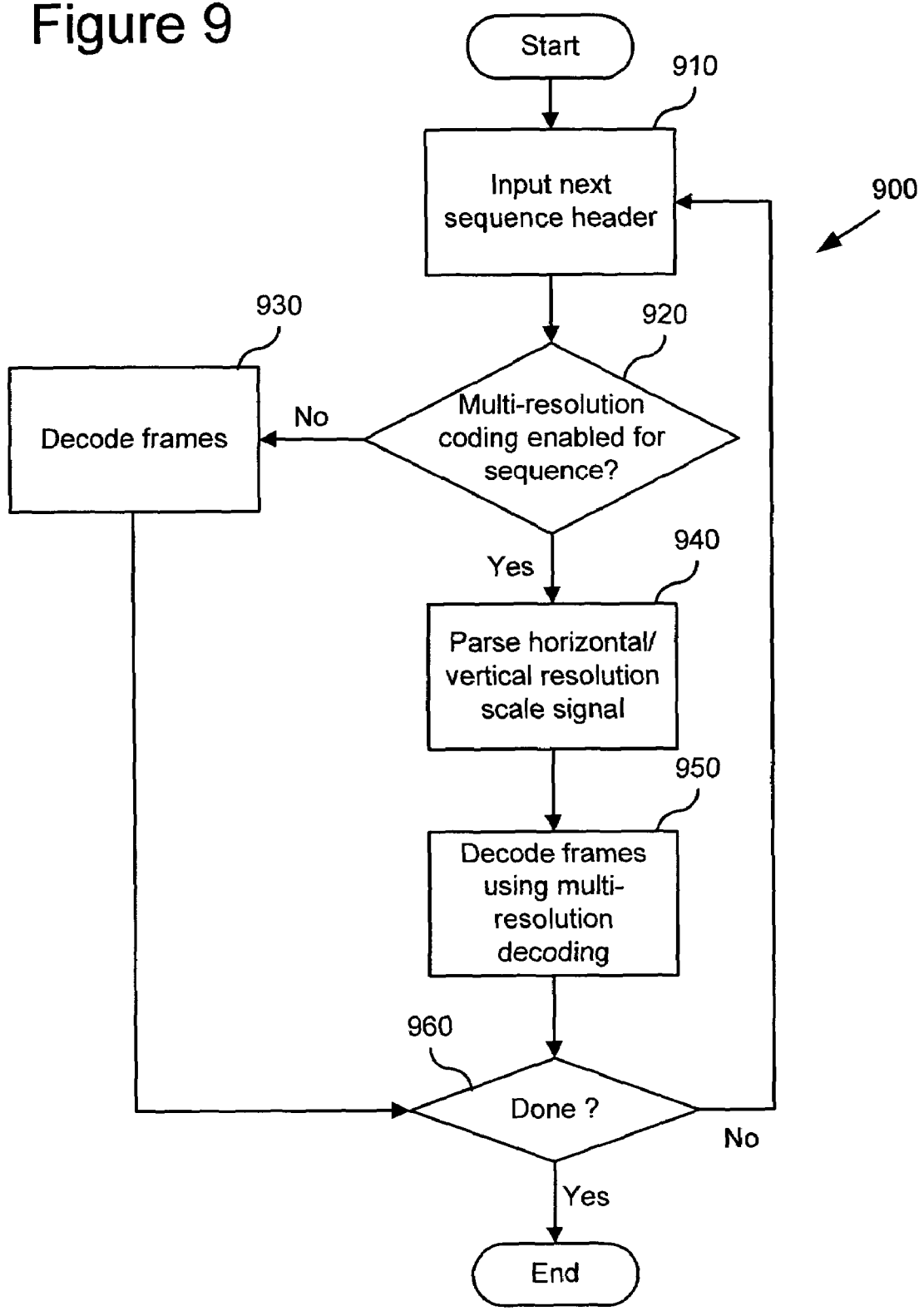
FIG. 9 is a flowchart showing a technique for receiving and interpreting signals when decoding sequences of encoded frames with multi-resolution decoding.

FIG. 9 shows a technique (900) for receiving and interpreting signals when decoding sequences of encoded frames with multi-resolution decoding. The decoder takes the next encoded sequence header as input (910) and checks the signal associated with the sequence to determine whether the encoder used multi-resolution encoding for the sequence (920).

If the encoder did not use multi-resolution encoding, the decoder decodes the frames in the sequence (930). On the other hand, if the encoder used multi-resolution encoding, the decoder parses the signal(s) indicating the scaling factor for the horizontal and/or vertical resolution for the frames (940). The decoder then decodes the frames accordingly (950) (for example, as described above with reference to FIG. 5 or FIG. 7).

If the decoding is done (960), the decoder exits. If not, the decoder decodes the next sequence.

B. Down-Sampling and Up-Sampling

The following sections describe the up-sampling and down-sampling process in some implementations. Other implementations use different up-sampling, down-sampling, or filtering techniques. For example, in alternative embodiments, an encoder may use non-linear filters or spatially-varying filter banks to encode frames.

Table 2 shows variable definitions used by the encoder and/or decoder for down-sampling/up-sampling of frames. The definitions are used below in pseudo-code for the down-sampling and up-sampling examples.

$N_u$=number of samples in up-sampled (full resolution) line $N_d$=number of samples in a down-sampled (half resolution) line $x_u[n]$=up-sampled sample value at position n, where n=0, 1, 2 . . . $N_u-1$ $x_d[n]$=down-sampled sample value at position n, where n=0, 1, 2 . . . $N_d-1$ Table 2: Variable Definitions for
Down-Sampling/Up-Sampling in Some
Implementations The term 'line' refers to the samples in a horizontal row or vertical column in a Y, Cr or Cb component plane. In the following examples, up-sampling and down-sampling operations are identical for both rows and columns and are therefore illustrated using a one-dimensional line of samples. In cases where both vertical and horizontal up-sampling or down-sampling is performed, the horizontal lines are re-sampled first followed by the vertical lines. Alternatively, both horizontal and vertical filtering are accomplished concurrently on blocks of pixels using a different filter.

Table 3 shows pseudo-code for re-sampling of luminance lines, while Table 4 shows pseudo-code for re-sampling of chrominance lines.

TABLE 3

Pseudo-code for re-sampling of luminance lines in some implementations $N_d = N_u/2$ (where $N_u$ is the number of samples in a full resolution luminance line)
if(($N_d$ & 15) != 0)
    $N_d = N_d + 16 - (N_d$ & 15)

TABLE 4

Pseudo-code for re-sampling of chrominance lines in some implementations $N_d = N_u/2$ (where $N_u$ is the number of samples in a full resolution chrominance line)
if(($N_d$ & 7) != 0)
    $N_d = N_d + 8 - (N_d$ & 7)

The re-sampling sets the number of samples for a down-sampled line. Then (for encoders that work with 4:2:0 or similar macroblocks), the re-sampling adjusts the number of samples in the line so the number is a macroblock multiple (i.e., multiple of 16) for luminance lines or a block multiple (i.e., multiple of 8) for chrominance lines.

1. Down-Sampling Filter

Down-sampling a line produces output according to the pseudo-code in Table 5.

TABLE 5

Pseudo-code for down-sampling of a line in some implementations

```
if (N_d != (N_u/2))
{
    for (i = N_u; i < N_d*2; i++)
        x_u[i] = x_u[N_u - 1]
}
downsamplefilter_line(x_u[])
for (i = 0; i < N_d; i ++)
    x_d[i] = x_u[i*2]
```

Code for the 6-tap filter used in downsample_filterline( ) is shown in FIG. 10. In FIG. 10, RND_DOWN is set to the value 64 when the image is filtered in the horizontal direction, and is set to the value 63 when the image is filtered in the vertical direction.

2. Up-Sampling Filter

Up-sampling a line produces output according to the pseudo-code in Table 6.

TABLE 6

Pseudo-code for up-sampling of a line in some implementations

```
for (i = 0; i < N_u; i ++)
{
    x_u[i] = x_d[i*2]
    x_u[i + 1] = 0
}
upsamplefilter_line(x_u[])
```

Example code for a 10-tap filter used in upsample_filter-line( ) is shown in FIG. 11. In FIG. 11, RND_UP is set to 15 when the image is filtered in the horizontal direction, and is set to 16 when the image is filtered in the vertical direction.

Other filter-pairs also may be used for re-sampling. Filter-pairs can be tailored to the content of the video and/or the target bitrate. An encoder can transmit a choice of filters as side information to a decoder.

C. Calculating New Frame Dimensions

The pseudo-code in Table 7 illustrates how the encoder calculates new frame dimensions for a down-sampled frame.

TABLE 7

Pseudo-code for calculating new frame dimensions after down-sampling

```
if (hscale == 1)
{
    x = X/2
    if ((x & 15) != 0)
        x = x + 16 - (x & 15)
}
if (vscale == 1)
{
    y = Y/2
    if ((y & 15) != 0)
        y = y + 16 - (y & 15)
}
```

X = Number of samples in horizontal dimension -- original resolution
Y = Number of samples in vertical dimension -- original resolution
x = New horizontal resolution
y = New vertical resolution
hscale = horizontal scaling factor (0 = full original resolution, 1 = half resolution)
vscale = vertical scaling factor (0 = full original resolution, 1 = half resolution)
x = X
y = Y In implementations using the technique shown in Table 7, the encoder calculates new frame dimensions by down-sampling the original dimensions by a factor of 2, and then rounding up so that the new dimensions are an integer multiple of macroblock size (multiple of 16). For chrominance lines, the encoder rounds up the dimensions to be an integer multiple of block size (multiple of 8). Rounding up the new dimensions allows the down-sampled frame to be encoded by video encoders/decoders using a 4:2:0 or similar macroblock format.

D. Alternatives

In conjunction with or in addition to the various alternatives described above, the encoder and decoder may operate as follows.

The multi-resolution framework can be extended to several levels of down-sampling for individual frames or series of frames. Using several levels of down-sampling can improve the quality of reconstructed frames when an encoder encodes high-resolution frames at relatively low bitrates.

An encoder can use multi-rate filtering techniques to re-sample frames to resolutions other than resolutions achieved by adjusting a resolution relative to an original resolution by factors of 2. For example, fractional-rate sampling can provide a smoother trade-off between preservation of high-frequency detail and reduced blocking artifacts, at the cost of increased complexity.

An encoder may apply different levels of re-sampling to different parts of the frame. For example, the encoder may encode regions of the frame with little high-frequency content at a down-sampled resolution, while the encoder may encode areas of the frame with strong high-frequency content at an original resolution. Further, the encoder may apply different filters to re-sample different parts of the frame, or for vertical and horizontal re-sampling. The encoder can use signaling to indicate different re-sampling levels and/or different filters used for re-sampling different parts of the frame.

Having described and illustrated the principles of our invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method for decoding a bitstream for a sequence of video frames, the method comprising:
   receiving and processing first information for the sequence, wherein the first information indicates whether multiple spatial resolution coding is enabled for the sequence;
   determining the first information indicates that multiple spatial resolution coding is enabled for the sequence, and then for each of plural frames in the sequence,
   receiving and processing second information at frame level in the bitstream, the second information indicating one or more spatial resolution scaling factors for the frame; and
   outputting a result of the processing;
   wherein the plural frames comprise at least one I-frame and at least one P-frame, wherein each of the at least one P-frame has a reference I-frame among the at least one I-frame, and wherein for each of the at least one P-frame the one or more spatial resolution scaling factors are constrained to be identical to the one or more spatial resolution scaling factors for the reference I-frame for that P-frame.

2. The method of claim 1 wherein the one or more spatial resolution scaling factors are determined adaptively based at least in part on bitrate criteria.

3. The method of claim 1 wherein the one or more spatial resolution scaling factors are determined adaptively based at least in part on high-frequency content criteria.

4. The method of claim 1 wherein the one or more spatial resolution scaling factors are determined adaptively based at least in part on quantization step size criteria.

5. The method of claim 1 wherein the second information is a fixed-length code.

6. The method of claim 5 wherein the fixed-length code is a 2-bit code that represents 4 possible states of the one or more spatial resolution scaling factors.

7. The method of claim 1 wherein the second information is a variable-length code.

8. The method of claim 1 wherein the first information is signaled in a sequence header.

9. The method of claim 8 wherein the first information is a 1-bit code in the sequence header.

10. The method of claim 1 further comprising:
receiving and processing third information in the bitstream, the third information indicating a selected re-sampling filter.

11. The method of claim 1 wherein the one or more spatial resolution scaling factors comprise a vertical spatial resolution scaling factor and a horizontal spatial resolution scaling factor.

12. The method of claim 11 wherein the vertical spatial resolution scaling factor differs from the horizontal spatial resolution scaling factor.

13. The method of claim 11 wherein the vertical spatial resolution scaling factor is selected from a set of vertical spatial resolutions comprising full resolution and half resolution.

14. The method of claim 11 wherein the horizontal spatial resolution scaling factor is selected from a set of horizontal spatial resolutions comprising full resolution and half resolution.

15. The method claim 1 further comprising:
decoding the plural frames with multiple spatial resolution decoding according to the spatial resolution scaling factors indicated by the second information;
displaying the plural frames.

16. The method of claim 15 wherein the decoding with multiple spatial resolution decoding comprises:
decoding a current frame of the plural frames encoded at a reduced spatial resolution; and
after decoding the current frame, up-sampling the current frame, wherein the up-sampling yields a full-resolution decoded frame.

17. The method of claim 16 wherein the up-sampling comprises applying a 10-tap filter to the decoded current frame.

18. The method of claim 16 wherein the displayed current frame at the reduced spatial resolution comprises reduced blocking artifacts.

19. A method of encoding a bitstream for a sequence of video frames, the bitstream having plural levels, the method comprising:
outputting first information for the sequence, the first information indicating whether multiple spatial resolution coding is enabled for the sequence; and
determining that multiple spatial resolution coding is enabled for the sequence, and then for each of plural frames in the sequence;
outputting second information at frame level in the bitstream, the second information indicating one or more spatial resolution scaling factors for the frame;
wherein the plural frames comprise at least one I-frame and at least one P-frame, wherein each of the at least one P-frame has a reference I-frame among the at least one I-frame, and wherein for each of the at least one P-frame the one or more spatial resolution scaling factors are constrained to be identical to the one or more spatial resolution scaling factors for the reference I-frame for that P-frame.

20. The method of claim 19 wherein the second information is a fixed-length code.

21. The method of claim 20 wherein the fixed-length code is a 2-bit code that represents 4 possible states of the one or more spatial resolution scaling factors.

22. The method of claim 19 wherein the second information is a variable-length code.

23. The method of claim 19 wherein the first information is signaled in a sequence header.

24. The method of claim 23 wherein the first information is a 1-bit code in the sequence header.

25. The method of claim 19 further comprising:
outputting third information in the bitstream, the third information indicating a selected re-sampling filter.

26. The method of claim 19 wherein the one or more spatial resolution scaling factors comprise a vertical spatial resolution scaling factor and a horizontal spatial resolution scaling factor.

27. The method of claim 26 wherein the vertical spatial resolution scaling factor differs from the horizontal spatial resolution scaling factor.

28. The method of claim 26 wherein the vertical spatial resolution scaling factor is selected from a set of vertical spatial resolutions comprising full resolution and half resolution.

29. The method of claim 26 wherein the horizontal spatial resolution scaling factor is selected from a set of horizontal spatial resolutions comprising full resolution and half resolution.

30. The method of claim 19 wherein the one or more spatial resolution scaling factors are determined adaptively based at least in part on bitrate criteria.

31. The method of claim 19 wherein the one or more spatial resolution scaling factors are determined adaptively based at least in part on high-frequency content criteria.

32. The method of claim 19 wherein the one or more spatial resolution sealing factors are determined adaptively based at least in part on quantization step size criteria.

33. The method of claim 19 further comprising:
encoding the plural frames with multiple spatial resolution coding according to the spatial resolution scaling factors indicated by the second information.

34. The method of claim 33 further comprising:
down-sampling a current frame of the plural frames, wherein the down-sampling yields a reduced-resolution frame.

35. The method of claim 34 wherein the down-sampling comprises applying a 6-tap filter to the current frame.

36. The method of claim 34 wherein the down-sampling comprises down-sampling in a horizontal direction prior to down-sampling in a vertical direction.

37. The method of claim 19 wherein a current frame of the plural frames includes plural lines, and wherein the multiple spatial resolution coding for the current frame includes adjusting number of samples in each of the plural lines so the number is a macroblock multiple.

38. A system comprising:
means for receiving and processing first information in a bitstream for a sequence of video frames, wherein the first information indicates whether multiple spatial resolution coding is enabled for the sequence;
means for receiving and processing second information at frame level in the bitstream for each of plural frames in the sequence if the first information indicates that multiple spatial resolution coding is enabled for the sequence, the second information indicating one or more spatial resolution scaling factors, wherein the plural frames comprise at least one I-frame and at least one P-frame, wherein each of the at least one P-frame has a reference I-frame among the at least one I-frame, and wherein for each of the at least one P-frame the one or more spatial resolution scaling factors are constrained to be identical to the one or more spatial resolution scaling factors for the reference I-frame for that P-frame; and
means for outputting a result of the processing.

39. A system comprising:

means for outputting first information in a bitstream for a sequence of video frames, the first information indicating whether multiple spatial resolution coding is enabled for the sequence; and means for outputting for each of plural frames in the sequence second information at frame level in the bitstream if the first information indicates that multiple spatial resolution coding is enabled for the sequence, the second information indicating one or more spatial resolution scaling factors for the frame, wherein the plural frames comprise at least one I-frame and at least one P-frame, wherein each of the at least one P-frame has a reference I-frame among the at least one I-frame, and wherein for each of the at least one P-frame the one or more spatial resolution scaling factors are constrained to be identical to the one or more spatial resolution scaling factors for the reference I-frame for that P-frame.

* * * * *

UNITED STATES PATENT AND TRADEMARK OFFICE
CERTIFICATE OF CORRECTION

| | | |
|---|---|---|
| PATENT NO. | : 7,379,496 B2 | Page 1 of 1 |
| APPLICATION NO. | : 10/644258 | |
| DATED | : May 27, 2008 | |
| INVENTOR(S) | : Thomas W. Holcomb et al. | |

It is certified that error appears in the above-identified patent and that said Letters Patent is hereby corrected as shown below:

In column 16, line 28, in Claim 32, delete "sealing" and insert -- scaling --, therefor.

Signed and Sealed this
Twelfth Day of July, 2011

David J. Kappos
*Director of the United States Patent and Trademark Office*